United States Patent
Im et al.

(10) Patent No.: US 10,020,710 B2
(45) Date of Patent: Jul. 10, 2018

(54) POLY-GENERATION SYSTEM

(71) Applicant: Korea Institute of Energy Research, Daejeon (KR)

(72) Inventors: Yong Hoon Im, Daejeon (KR); Gyu Sung Choi, Daejeon (KR); Dong Hyun Lee, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 45 days.

(21) Appl. No.: 15/124,704

(22) PCT Filed: Mar. 18, 2014

(86) PCT No.: PCT/KR2014/002259
§ 371 (c)(1),
(2) Date: Sep. 9, 2016

(87) PCT Pub. No.: WO2015/137545
PCT Pub. Date: Sep. 17, 2015

(65) Prior Publication Data
US 2017/0018995 A1    Jan. 19, 2017

(30) Foreign Application Priority Data
Mar. 10, 2014  (KR) ........................ 10-2014-0027743

(51) Int. Cl.
*H02K 7/18* (2006.01)
*H02K 35/02* (2006.01)
(Continued)

(52) U.S. Cl.
CPC .......... *H02K 7/1815* (2013.01); *F02B 75/28* (2013.01); *H02J 7/32* (2013.01); *H02K 7/1884* (2013.01);
(Continued)

(58) Field of Classification Search
CPC .............. H02J 7/22; H02J 7/244; F02B 63/04
(Continued)

(56) References Cited

U.S. PATENT DOCUMENTS

| | | | | |
|---|---|---|---|---|
| 3,525,887 A | * | 8/1970 | D'Ewart, Jr. .......... | H02K 33/00 310/17 |
| RE27,567 E | * | 1/1973 | Baumgardner ......... | F02G 1/057 290/1 R |

(Continued)

FOREIGN PATENT DOCUMENTS

| JP | 2001-309574 | 4/2003 |
|---|---|---|
| JP | 2013-072358 A | 7/2013 |

(Continued)

OTHER PUBLICATIONS

European Patent Office, "Supplementary European Search Report and Annex," EPO, (Aug. 18, 2017).

*Primary Examiner* — Tulsidas C Patel
*Assistant Examiner* — Charles Reid, Jr.
(74) *Attorney, Agent, or Firm* — Hammer & Associates, P.C.

(57) ABSTRACT

A poly-generation system includes: at least one cylinder; a reciprocating piston provided in the cylinder; an engine rotor generates a magnetic force and reciprocates with the piston; an engine stator includes an engine coil which induces an electromotive force by interference with the reciprocating engine rotor and outputs the electromotive force induced in the engine coil; and a generator which is integrally coupled with a reciprocating shaft of the piston and generates electricity using an inertial force generated by the reciprocating piston, the generator includes: an elastic member deformed by the inertial force; a generator rotor includes a generator magnet and reciprocates due to the deformation of the elastic member; a generator stator includes a generator coil and outputs an electromotive force induced in the generator coil (Continued)

due to interference with the generator magnet, and a generator battery stores the electromotive force induced in the generator coil.

4 Claims, 4 Drawing Sheets

(51) Int. Cl.
    *H02K 35/00*     (2006.01)
    *H02J 7/32*     (2006.01)
    *F02B 75/28*     (2006.01)
    *F02B 75/26*     (2006.01)
    *F02B 77/14*     (2006.01)
    *F02D 29/06*     (2006.01)

(52) U.S. Cl.
    CPC ............. *H02K 35/00* (2013.01); *H02K 35/02* (2013.01); *F02B 75/26* (2013.01); *F02B 77/14* (2013.01); *F02D 29/06* (2013.01)

(58) Field of Classification Search
    USPC .......................................................... 290/50
    See application file for complete search history.

(56) References Cited

U.S. PATENT DOCUMENTS

| | | | |
|---|---|---|---|
| 3,766,399 A | 10/1973 | Demetrescu | |
| 4,511,805 A * | 4/1985 | Boy-Marcotte | F02G 1/0435 290/1 R |
| 4,594,521 A * | 6/1986 | Schlicher | F41B 6/00 290/1 R |
| 6,049,146 A | 4/2000 | Takara | |
| 6,530,756 B2 * | 3/2003 | Morita | F04B 35/045 310/12.29 |
| 6,705,085 B1 * | 3/2004 | Braithwaite | E21B 41/0085 290/1 R |
| 7,495,358 B2 * | 2/2009 | Kobayashi | A61C 17/3445 15/22.1 |
| 8,541,895 B2 | 9/2013 | Kuriki | |
| 2002/0195884 A1 * | 12/2002 | Ichii | A61C 17/34 310/15 |
| 2004/0130221 A1 * | 7/2004 | Ichii | A61C 17/34 310/12.31 |
| 2008/0001578 A1 | 1/2008 | Cap | |
| 2008/0277939 A1 * | 11/2008 | Richardson | B60G 9/003 290/50 |
| 2009/0085359 A1 | 4/2009 | Mabuchi et al. | |
| 2011/0133577 A1 * | 6/2011 | Lee | H02K 33/18 310/15 |
| 2011/0227347 A1 * | 9/2011 | Chae | F01K 25/00 290/1 A |
| 2012/0193919 A1 * | 8/2012 | Kuriki | B60G 13/06 290/52 |
| 2012/0255434 A1 | 10/2012 | Cockerill | |

FOREIGN PATENT DOCUMENTS

| | | |
|---|---|---|
| KR | 10-0622890 B1 | 10/1999 |
| KR | 1020130002386 A | 1/2013 |
| WO | WO97/23928 | 7/1997 |
| WO | WO 2011/043027 A1 | 4/2011 |

\* cited by examiner

POLY-GENERATION SYSTEM

TECHNICAL FIELD

The present invention relates to a poly-generation system, and more particularly, to a poly-generation system capable of additionally producing electricity using an inertial force caused by reciprocation.

BACKGROUND ART

Faraday's law is a law electromagnetic induction, in which due to a change of a magnetic flux which passes through a coil, caused by a movement of a magnet around the coil, a current is induced in the coil, is generally applied to operating of a generator, a motor, etc.

For example, a reciprocating engine generally induces reciprocation through combustion of fuel and converts the reciprocation into a rotary motion, thereby producing electricity based on an electromagnetic induction phenomenon generated through the rotary motion. Also, for example, an electromagnetic engine induces reciprocation using an electromagnetic force generated through a supply of external power such as a battery, not combustion of fuel, and converts the reciprocation into a rotary motion, thereby producing electricity based on the electromagnetic induction phenomenon generated through the rotary motion.

A poly-generation system denotes an energy system which generates a plurality of outputs from a single input such as a cogeneration system which outputs electricity and thermal energy for heating using fuel as an input.

DISCLOSURE

Technical Problem

The present invention is directed to a poly-generation system capable of additionally producing electricity using reciprocation generated through combustion of fuel.

Technical Solution

According to an aspect of the present invention, there is provided A poly-generation system comprising: at least one cylinder; a piston provided in the cylinder and configured to reciprocate; an engine rotor which generates a magnetic force and reciprocates in conjunction with the reciprocation of the piston; an engine stator which comprises an engine coil which induces an electromotive force by interference with the engine rotor generated due to the reciprocation of the engine rotor and outputs the electromotive force induced in the engine coil; and a generator which is integrally coupled with a reciprocating shaft of the piston and generates electricity using an inertial force generated by the reciprocation of the piston, wherein the generator comprises: an elastic member deformed by the inertial force; a generator rotor which generates a magnetic force and reciprocates due to the deformation of the elastic member; a generator stator which comprises a generator coil which induces an electromotive force by interference with the generator rotor generated due to the reciprocation of the generator rotor and outputs the electromotive force induced in the generator coil, a generator battery which stores the electromotive force induced in the generator coil, a generator housing which is integrally coupled with the reciprocating shaft of the piston and accommodates the generator battery therein, and a connector hinge-coupled to an outside of the generator housing and electrically connected to the generator battery.

Advantageous Effects

According to the embodiments of the present invention described above, a reciprocating engine and a poly-generation system may additionally produce electricity using reciprocation generated through combustion of fuel, thereby increasing energy efficiency.

Also, when the reciprocating engine is applied to a place using axial thrust such as a vehicle, a vessel, etc., it is possible to produce additional electricity in addition to the axial thrust necessary for driving, and there is an effect of reducing fuel consumption by supplying the produced electricity into the driving.

MODE FOR INVENTION

Figure 1:
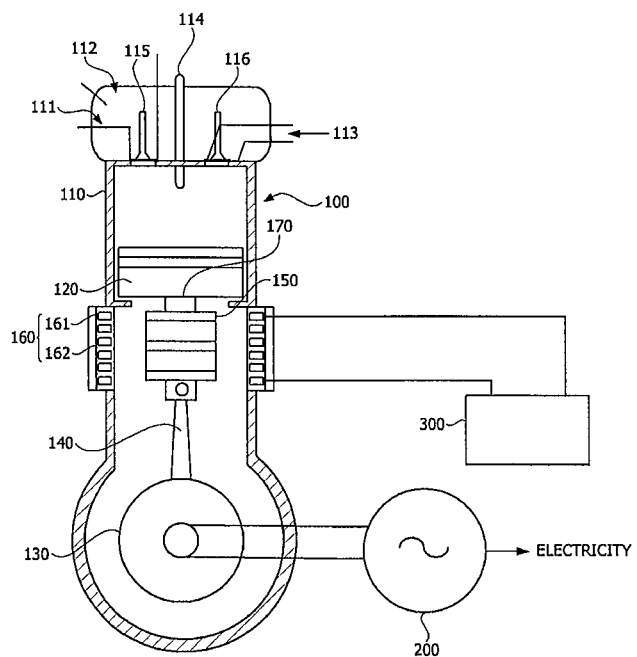
FIG. 1 is a schematic cross sectional view of a poly-generation system according to one embodiment of the present invention.

Since the present invention may have various modifications and several embodiments, exemplary embodiments thereof will be described in detail referring to the drawings. However, the present invention will not be limited to the exemplary embodiments but should be understood as including all modifications, equivalents, and substitutes included in the spirit and the technical scope of the present invention.

It will be understood that although the terms "first", "second", etc. may be used herein to describe various components, these components should not be limited by these terms. These terms are used merely to distinguish one element from another. For example, without departing from the scope of the present invention, a second component may be designated as a first component, and similarly, the first component may be designated as the second component. The term "and/or" includes any and all combinations or one of a plurality of associated listed items.

Also, terms "module" and "portion" used for components are given or mixed with each other only considering easiness of drafting the specification, which do not have mutually distinguished meanings or roles as themselves.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening component.

It will be understood that when a component such as a layer, film, region, plate or portion is referred to as being "formed on," another component, it can be directly or indirectly formed on the other component. That is, for example, intervening components may be present. On the contrary, when a component is referred to as being "directly formed on" another component, it will be understood that there is no intervening component.

Terms are used herein only to describe the exemplary embodiments but not to limit the present invention. Singular expressions, unless defined otherwise in contexts, include plural expressions. In the present specification, terms "comprise" or "have", etc. are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless defined otherwise, have the same meaning generally understood by a person of ordinary skill in the art. It will be understood that terms defined in generally used dictionaries are interpreted as including meanings identical to contextual meanings of the related art, unless clearly defined otherwise in the present application, are not interpreted as being ideal or excessively formal meanings.

Hereinafter, the embodiments of the present invention will be described with reference to the attached drawings. Throughout the specification, like reference numerals designate like elements and a repetitive description thereof will be omitted.

Hereinafter, referring to FIGS. 1 to 3, a poly-generation system according to one embodiment of the present invention will be described in detail.

FIG. 1 is a schematic cross sectional view of the poly-generation system according to one embodiment of the present invention.

Referring to FIG. 1, the poly-generation system according to one embodiment of the present invention may include a reciprocating engine 100 which generates a mechanical motion by combusting fuel, a generator 200 which generates electricity using axial thrust generated by the reciprocating engine 100, and a battery 300 which stores an electromotive force generated by an electromagnetic induction phenomenon of the reciprocating engine 100.

The reciprocating engine 100 may include a cylinder 110 which forms a combustion chamber, a piston 120 which is provided in the cylinder 110 and reciprocates, and a crank shaft 130 which converts a linear motion of the piston 120 into a rotary motion.

The cylinder 110 includes an intake pipe 111 through which air is injected into the combustion chamber, a fuel supply pipe 112 through which fuel is injected into the combustion chamber, an exhaust pipe 113 through which exhaust gas in the combustion chamber is discharged, and an igniter 114 which ignites the fuel in the combustion chamber according to an ignition signal. Also, an intake valve 115 and an exhaust valve 116 to regulate intake and exhaust are provided in the intake pipe 111 and the exhaust pipe 113, respectively.

The piston 120 and the crank shaft 130 are connected to each other by a connecting rod 140. The connecting rod 140 converts the reciprocation of the piston 120 into a rotary motion and transfers the rotary motion to the crank shaft 130. That is, when the piston 120 reciprocates, the connecting rod 140 rotates the crank shaft 130 connected to the piston 120.

The crank shaft 130 is connected to the generator 200, and axial thrust generated by the rotary motion of the crank shaft 130 is transferred to the generator 200. Accordingly, the generator 200 generates electricity through an electromagnetic induction phenomenon using the axial thrust generated by the rotary motion of the crank shaft 130.

Meanwhile, the reciprocating engine 100 may further include an engine rotor 150 which generates a magnetic force and an engine stator 160 which includes an engine coil 161 which interacts with the engine rotor 150 to generate electricity.

The engine rotor 150 may include at least one engine magnet which generates a magnetic force and may reciprocate in conjunction with the reciprocation of the piston 120.

To be in conjunction with the reciprocation of the piston 120, the engine rotor 150 may be coupled to the piston 120 in various methods.

For example, as shown in FIG. 1, the engine rotor 150 may be coupled to the piston 120 to surround an outer circumferential surface of a reciprocating shaft 170 which reciprocates due to the reciprocation of the piston 120. In this case, the connecting rod 140 which converts the reciprocation of the piston 120 into the rotary motion of the crank shaft 130 may be coupled to the reciprocating shaft 170 rather than the piston 120.

Also, for example, the connecting rod 140 may be directly coupled to the piston 120 without being coupled to the additional reciprocating shaft 170.

The engine stator 160 has an approximately cylindrical shape and includes a through hole in a center thereof to allow the engine rotor 150 to reciprocate and is spaced from an outer circumferential surface of the engine rotor 150 at a predetermined distance.

The engine stator 160 includes the engine coil 161 and a stator holder 162 on which the engine coil 161 is wound. An electromotive force is induced in the engine coil 161 of the engine stator 160 by interference with the engine magnet caused by the reciprocation of the engine rotor 150. The electromotive force induced in the engine coil 161 due to the reciprocation of the engine rotor 150 is transferred to and stored in the battery 300 through an output terminal.

Meanwhile, although the engine stator 160 is coupled to a lower portion of the cylinder 110 in FIG. 1, the engine stator 160 may be coupled to the reciprocating engine 100 in a different method depending on a method of coupling the engine rotor 150 to the piston 120.

For example, when the engine rotor 150 is coupled to a head of the piston 120, the engine stator 160 may be integrally coupled to an outer wall or an inside of the cylinder 110.

According to the above description, the poly-generation system according to one embodiment of the present invention may utilize the axial thrust of the reciprocating engine 100 generated through combustion of fuel and may generate additional electricity using the electromagnetic induction phenomenon without loss of the axial thrust.

The poly-generation system described above may be applied to various fields.

Hereinafter, examples of applying the poly-generation system according to one embodiment of the present invention will be described with reference to the drawings.

Figure 2:
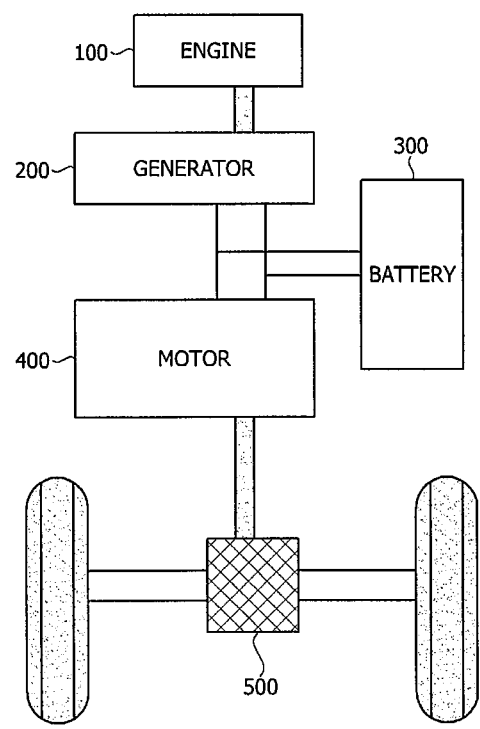
FIGS. 2 and 3 are views illustrating examples of applying the poly-generation system according to one embodiment of the present invention to a vehicle.
Figure 3:
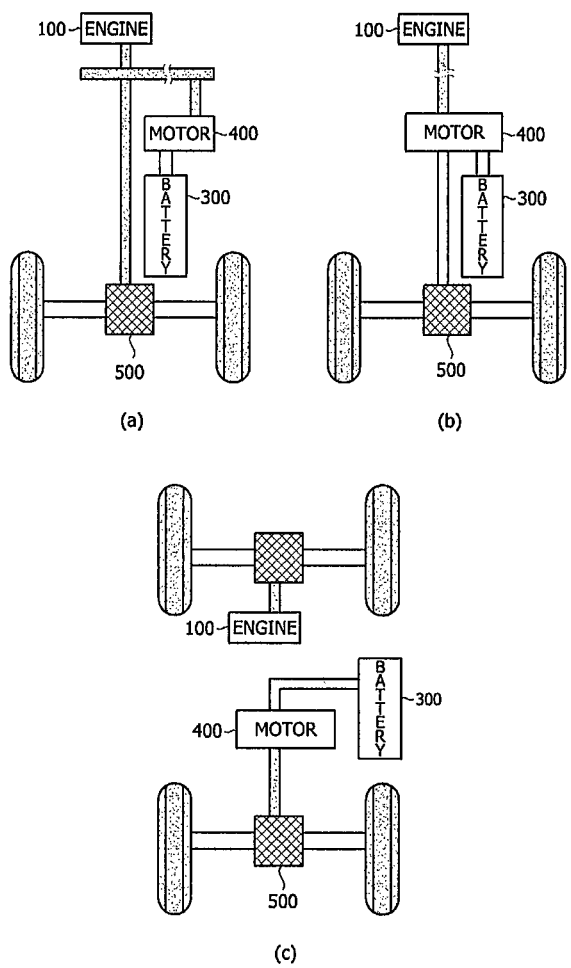

FIGS. 2 and 3 are views illustrating the examples of applying the poly-generation system according to one embodiment of the present invention to a vehicle.

FIG. 2 illustrates an example of applying the poly-generation system according to one embodiment to a parallel hybrid vehicle. In a parallel type, the reciprocating engine 100 drives the generator 200 and the generator 200 supplies currents to the motor 400 to move a driving shaft 500. That is, in the case of the parallel type, the motor 400 moves the driving shaft 500 and the reciprocating engine 100 only supplies electricity to the motor 400.

Referring to FIG. 2, when the poly-generation system according to one embodiment of the present invention is applied to the vehicle, unlike a way of driving the motor 400 depending only on electricity production through the rotary motion of the crank shaft 130 (refer to FIG. 1) included in the reciprocating engine 100, it is possible to additionally use electricity produced resulting from the reciprocation of the piston 120 (refer to FIG. 1) in such a way that an amount of electricity production and an amount of electricity transferred to the motor 400 increases, thereby increasing by about two times an output of the motor 400.

FIG. 3 illustrates examples of applying the poly-generation system according to one embodiment of the present invention to parallel hybrid vehicles. (a), (b), and (c) of FIG. 3 illustrate a two-axle arrangement torque combination hybrid vehicle, a one-axle arrangement torque combination hybrid vehicle, and a traction force combination hybrid vehicle, respectively.

Meanwhile, in the parallel type hybrid vehicle, the reciprocating engine 100 and the motor 400 simultaneously transfer force to the driving shaft 500. That is, in the parallel type hybrid vehicle, since the reciprocating engine 100 is directly connected to the driving shaft 500, it is unnecessary to perform a process of converting the axial thrust obtained through the reciprocating engine 100 into electricity using the generator 200.

When the poly-generation system according to one embodiment of the present invention is applied to a parallel hybrid vehicle, electricity generated based on the reciprocation of the piston 120 along with the driving of the driving shaft 500 using the rotary motion of the crank shaft 130 is stored in the battery 300 and used to drive the motor 400, thereby increasing energy utilization efficiency.

As described above, according to one embodiment of the present invention, the reciprocating engine 100 and the poly-generation system including the same may use the reciprocation generated by combusting fuel to produce additional electricity in addition to axial thrust production, thereby increasing energy efficiency.

Also, when the reciprocating engine is applied to a place using axial thrust such as a vehicle, a vessel, etc., it is possible to produce additional electricity in addition to the axial thrust necessary for driving, and there is an effect of reducing fuel consumption by supplying the produced electricity into the driving.

Hereinafter, referring to FIGS. 4 to 7, a poly-generation system according to another embodiment of the present invention will be described in detail.

Figure 4:
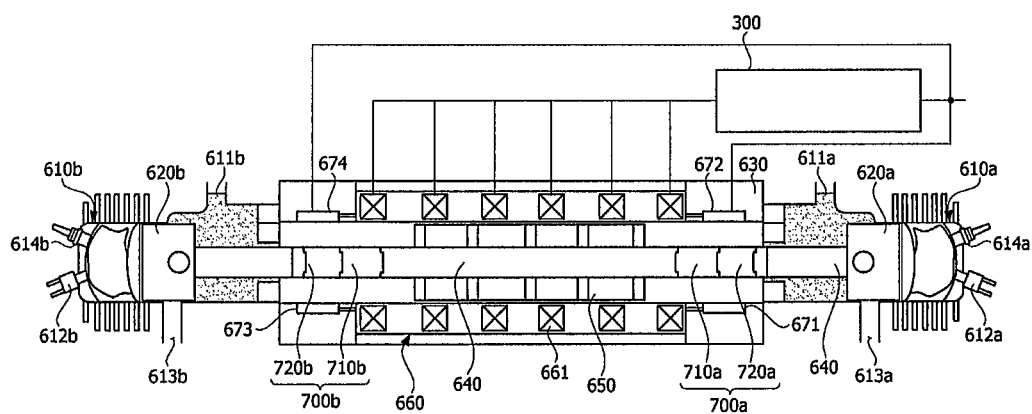
FIG. 4 is a schematic cross sectional view of a poly-generation system according to another embodiment of the present invention.
Figure 5:
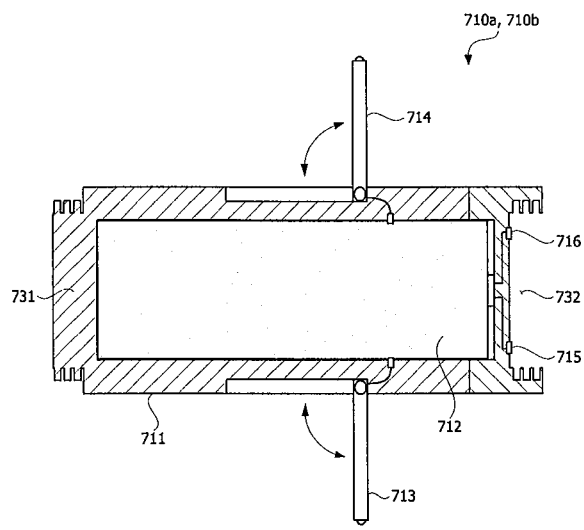
FIGS. 5 to 7 are views for explaining a generator of the poly-generation system according to another embodiment of the present invention.
Figure 6:
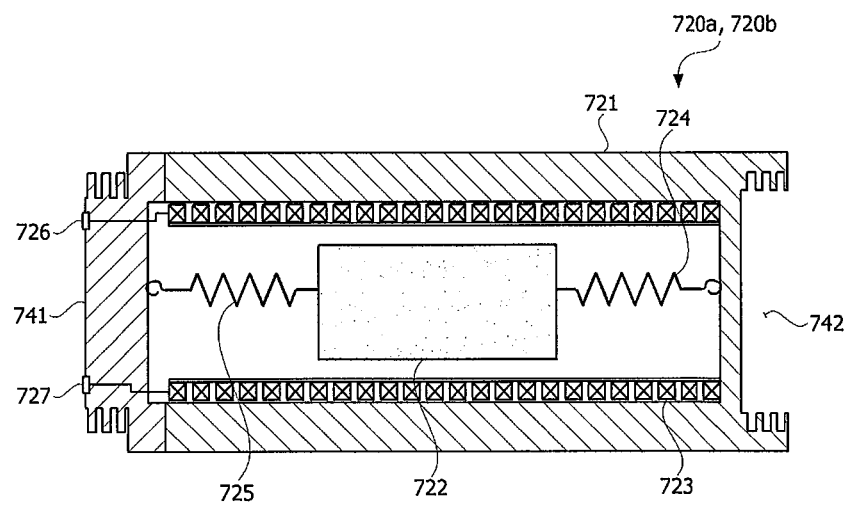
Figure 7:
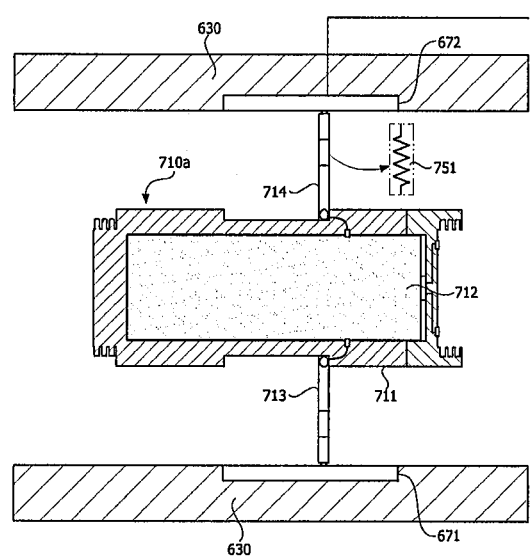

FIG. 4 is a schematic cross sectional view of the poly-generation system according to another embodiment of the present invention. Also, FIGS. 5 to 7 are views for explaining a generator of the poly-generation system according to another embodiment of the present invention.

Referring to FIG. 4, the poly-generation system according to another embodiment of the present invention may include a linear engine 600 which generates mechanical reciprocation using power generated by combusting fuel, generators 700a and 700b which generate electricity using an inertial force generated by the reciprocation of the linear engine 600, and a battery 300 which stores an electromotive force generated by an electromagnetic induction phenomenon of the linear engine 600.

The linear engine 600 may include cylinders 610a and 610b which are provided at both ends of the linear engine 600 and form combustion chambers and pistons 620a and 620b which are provided at the respective cylinders 610a and 610b and reciprocate.

The cylinders 610a and 610b include intake pipes 611a and 611b through which air is injected into the combustion chamber, fuel supply pipes 612a and 612b through which fuel is injected into the combustion chamber, exhaust pipes 613a and 613b through which exhaust gas in the combustion chamber is discharged, and igniters 614a and 614b which ignite the fuel in the combustion chamber according to an ignition signal. Also, the respective cylinders 610a and 610b may further include intake values (not shown) and exhaust valves (not shown) which are provided at the intake pipes 611a and 611b and the exhaust pipes 613a and 613b respectively to regulate intake and exhaust.

The respective pistons 620a and 620b are connected to each other by a connecting rod 640.

The linear engine 600 may further include an engine rotor 650 which generates a magnetic force and an engine stator 660 which includes an engine coil 661 which interacts with the engine rotor 650 to generate electricity.

The engine rotor 650 may include at least one engine magnet which generates a magnetic force and may reciprocate in conjunction with the reciprocation of the pistons 620a and 620b.

To be in conjunction with the reciprocation of the pistons 620a and 620b, the engine rotor 650 may be coupled to the pistons 620a and 620b in various ways. For example, as shown in FIG. 4, the engine rotor 650 may be coupled to surround an outer circumferential surface of the connecting rod 640 which is connected to the pistons 620a and 620b at both ends and operates as a reciprocating shaft of the pistons 620a and 620b. That is, the connecting rod 640 may be inserted into and coupled to the center of the engine rotor 650.

The engine stator 660 includes a through hole which has an approximately cylindrical shape to allow the engine rotor 650 to be accommodated therein to reciprocate. The engine stator 660 is disposed to be spaced at a predetermined distance from an outer circumferential surface of the engine rotor 650.

The engine stator 660 includes the engine coil 661 and a stator holder on which the engine coil 661 is wound.

When combustion is sequentially generated at the cylinders 610a and 610b located at both ends of the linear engine 600, the pistons 620a and 620b in the respective cylinders 610a and 610b start reciprocation. Accordingly, the engine rotor 650 integrally coupled to the two pistons 620a and 620b through the connecting rod 640 starts reciprocation in conjunction with the reciprocation of the two pistons 620a and 620b. An electromotive force is induced in the engine coil 661 of the engine stator 660 by interference with the engine magnet generated due to the reciprocation of the engine rotor 650. The electromotive force induced in the engine coil 661 of the engine stator 660 due to the reciprocation of the engine rotor 650 may be transferred to the battery 300 through an output terminal and may be stored therein.

Between the pistons 620a and 620b at both ends and the connecting rod 640, one or more generators 700a and 700b may be integrally coupled.

The respective generators 700a and 700b include battery modules 710a and 710b and generating modules 720a and 720b and may generate electricity from the reciprocation of the pistons 620a and 620b of the linear engine 600.

FIG. 5 illustrates the battery modules 710a and 710b, and FIG. 6 illustrates the generating modules 720a and 720b.

Referring to FIG. 5, the battery modules 710a and 710b each include a battery module housing 711 having an inner space portion which accommodates a generator battery 712 therein and the generator battery 712 accommodated in the inner space portion of the battery module housing 711.

The battery module housing 711 has a cylindrical shape and includes coupling portions 731 and 732 at both ends thereof, to which the connecting rod 640 of the linear engine 600 and the generating modules 720a and 720b are coupled, respectively. For example, in FIG. 5, the coupling portion 731 which has a male screw shape screw-coupled to the connecting rod 640 may protrude from one end of the battery module housing 711 and a groove portion 732 which has a female screw shape screw-coupled to the generating modules 720a and 720b may be formed at the other end of the battery module housing 711.

Connectors 713 and 714 hinge-coupled to an outer wall of the battery module housing 711 and electrically connected to the generator battery 712 in the battery module housing 711 may be disposed on the outer wall of the battery module housing 711. The connectors 713 and 714 may each include a resistor 751 to transfer electricity and may operate as paths for storing the additional electricity generated by the generating modules 720a and 720b in the battery modules 710a and 710b and transferring the additional electricity to the battery 300 on the outside.

The connectors 713 and 714 maintain a closed state to the outer wall of the battery module housing 711 while the linear engine 600 is operating to maintain an electrically insulated state from ground contact portions 671, 672, 673, and 674. On the other hand, when the linear engine 600 stops, that is, the pistons 620a and 620b stop reciprocation, as shown in FIG. 7, the connectors 713 and 714 are changed into an open state to the battery module housing 711 and operate to electrically connect the generator battery 712 in the battery module housing 711 with the ground contact portions 671, 672, 673, and 674 of the linear engine 600.

The ground contact portions 671, 672, 673, and 674 are disposed at an inner circumferential surface of a housing 630 of the linear engine 600 which accommodates the generators 700a and 700b and may be electrically connected to the battery 300 on the outside.

Accordingly, when the linear engine 600 stops, electricity stored in the generator battery 712 during an operation of the linear engine 600 may be transferred to the battery 300 outside the linear engine 600 through the ground contact portions 671, 672, 673, and 674.

Meanwhile, the battery modules 710a and 710b may further include motors (not shown) to control an opening and closing of the connectors 713 and 714 depending on the operation of the linear engine 600. The motors receive operation power supply from the generator batteries 712 in the battery modules 710a and 710b to open and close the connectors 713 and 714.

The generator batteries 712 may be disposed in the battery modules 710a and 710b. The generator batteries 712 may be electrically connected to the generating modules 720a and 720b through connecting terminals 715 and 716 exposed outside the battery module housing 711. Accordingly, the generator battery 712 may perform a function of receiving and storing electricity generated by the generating modules 720a and 720b through the connecting terminals 715 and 716.

Referring to FIG. 6, the generating modules 720a and 720b may each include a generating module housing 721 having a cylindrical shape, a generator rotor 722 accommodated in the generating module housing 721, and a generator stator 723 including a generator coil which interacts with the generator rotor 722 to generate electricity.

The generating module housing 721, like the battery module housing 711, may include coupling portions 741 and 742 at both ends thereof, to which the battery modules 710a and 710b and the connecting rod 640 of the linear engine 600 are connected, respectively. That is, in the embodiment shown in FIGS. 5 and 6, a male screw shaped coupling portion 741 of the generating module housing 721 and the female screw shaped groove portion 732 of the battery module housing 711 may be screw-coupled to each other.

The generator rotor 722 may include at least one generator magnet which generates a magnetic force and both ends thereof may be fixed to the generating module housing 721 by a plurality of elastic members 724 and 725. In such structure described above, the plurality of elastic members 724 and 725 may be deformed by an inertial force of the reciprocation of the pistons 620a and 620b. The generator rotor 722 may reciprocate due to the deformation of the elastic members 724 and 725 generated in conjunction with the reciprocation of the pistons 620a and 620b. For this, the elastic members 724 and 725 may fix the generator rotor 722 to the generating module housing 721 in an axial direction of the reciprocation of the pistons 620a and 620b.

The generator stator 723 includes a through hole which has an approximately cylindrical shape to allow the generator rotor 722 to be accommodated therein to reciprocate. The generator stator 723 may be fixed to an inner circumferential surface of the generating module housing 721 to be spaced at a predetermined distance from an outer circumferential surface of the generator rotor 722. For example, the generator stator 723 may be provided in a shape in which the generator coil is wound on the inner circumferential surface of the generating module housing 721.

When the pistons 620a and 620b of the linear engine 600 start reciprocation, the elastic members 724 and 725 of the generating modules 720a and 720b are allowed to reciprocate due to the inertial force caused by the reciprocation of the pistons 620a and 620b. Accordingly, the generator rotor 722 coupled between the elastic members 724 and 725 also reciprocates in the generating module housing 721 and an electromotive force is induced in the generator coil of the generator stator 723 by interference with the generator magnet generated due to the reciprocation of the generator rotor 722. The electromotive force induced in the generator coil of the generator stator 723 due to the reciprocation of the generator rotor 722 may be transferred to the battery modules 710a and 710b through connecting terminals 726 and 727 to be stored therein.

In the embodiment described above, although the battery module housings 711 of the battery modules 710a and 710b which form the generator 700a and 700b have been described separately from the generating module housings 721 of the generating modules 720a and 720b, the battery module housings 711 and the generating module housings 721 may be commonly called "generator housings". Also, in another embodiment, the battery module housing 711 and the generating module housing 721 may be integrally formed as "a generator housing".

Meanwhile, in the above, although functionally identical components included in each of the linear engine 600 and the generators 700a and 700b in the poly-generation system are designated as engines or generators such as an engine rotor/generator motor, an engine coil/generator coil, and an engine magnet/generator magnet, these are intended for convenience, but are not limited thereto.

As described above, according to another embodiment of the present invention, the linear engine 600 and the poly-generation system including the same may produce additional electricity using the inertial force caused by the reciprocation in addition to electricity production due to the reciprocation generated by combusting fuel, thereby increasing energy efficiency.

Also, a part of an existing connecting rod in a linear engine is replaced by a generator and a space portion is formed inside a generator housing of the generator and accommodates a rotor, stator, battery, etc., thereby minimizing an additional increase in weight in an existing linear engine to minimize a linear momentum reduction of the linear engine.

Also, when such linear engine described above is applied to a place using axial thrust, such as a vehicle, a vessel, etc., it is possible to produce additional electricity in addition to the axial thrust necessary for driving, and there is an effect of reducing fuel consumption by supplying the produced electricity into the driving.

While the present invention has been preferentially shown and described with reference to exemplary embodiments thereof, it will be understood by those of ordinary skill in the art that various changes in form and details may be made therein without departing from the spirit and scope of the present invention as defined by the following claims.

The invention claimed is:

1. A poly-generation system comprising:
   at least one cylinder;
   a piston provided in the cylinder and configured to reciprocate;
   an engine rotor which generates a magnetic force and reciprocates in conjunction with the reciprocation of the piston;
   an engine stator which comprises an engine coil which induces an electromotive force by interference with the engine rotor generated due to the reciprocation of the engine rotor and outputs the electromotive force induced in the engine coil; and
   a generator which is integrally coupled with a reciprocating shaft of the piston and generates electricity using an inertial force generated by the reciprocation of the piston,
   wherein the generator comprises:
   an elastic member deformed by the inertial force;
   a generator rotor which generates a magnetic force and reciprocates due to the deformation of the elastic member;
   a generator stator which comprises a generator coil which induces an electromotive force by interference with the generator rotor generated due to the reciprocation of the generator rotor and outputs the electromotive force induced in the generator coil, and
   a generator battery which stores the electromotive force induced in the generator coil,
   a generator housing which is integrally coupled with the reciprocating shaft of the piston and accommodates the generator battery therein; and
   a connector hinge-coupled to an outside of the generator housing and electrically connected to the generator battery.

2. The poly-generation system of claim 1, further comprising an engine housing which accommodates the reciprocating shaft and the generator therein,
   wherein a ground contact portion electrically connected to a battery located outside of the engine housing and selectively connected to the connector is disposed on an inner circumferential surface of the engine housing.

3. The poly-generation system of claim 2, wherein the connector is electrically connected to the ground contact portion in a state of being open to the generator housing.

4. The poly-generation system of claim 3, wherein the connector is electrically insulated from the ground contact portion in a state of being closed to the generator housing.

\* \* \* \* \*